United States Patent
Tagane

(10) Patent No.: US 7,882,241 B2
(45) Date of Patent: Feb. 1, 2011

(54) COMMUNICATION MANAGEMENT APPARATUS AND COMMUNICATION MANAGEMENT METHOD

(75) Inventor: Junji Tagane, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 11/863,521

(22) Filed: Sep. 28, 2007

(65) Prior Publication Data

US 2008/0098255 A1    Apr. 24, 2008

(30) Foreign Application Priority Data

Oct. 18, 2006    (JP) .............................. 2006-284255

(51) Int. Cl.
*G06F 15/16*    (2006.01)

(52) U.S. Cl. ................ 709/227; 379/22.03; 379/221.04

(58) Field of Classification Search ................ 709/203, 709/227–229; 379/22.03, 221.04
See application file for complete search history.

(56) References Cited

U.S. PATENT DOCUMENTS 5,369,759 A * 11/1994 Kanbe ........................... 714/2
7,272,399 B2 * 9/2007 Han ........................... 455/450
7,539,127 B1 * 5/2009 Shaffer et al. ............... 370/216
2003/0105813 A1 * 6/2003 Mizutani ..................... 709/203

FOREIGN PATENT DOCUMENTS

| JP | 3-19556 | 1/1991 |
| JP | 7-123451 | 5/1995 |
| JP | 8-228226 | 9/1996 |

* cited by examiner

*Primary Examiner*—Moustafa M Meky
(74) *Attorney, Agent, or Firm*—Fujitsu Patent Center

(57) ABSTRACT

A transmitting/receiving unit receives a SIP signal after occurrence of trouble in a SIP server and outputs a call ID of the SIP signal to a recovery-file searching unit. A session control unit once again procures a call process resource and an instance for a session corresponding to a recovery file and stores the call process resource data and the instance data in a main storage unit. The main storage unit stores anew session data included in the recovery file. A recovery-file creating unit creates the recovery file. An external storage unit stores therein the recovery file. The recovery-file searching unit retrieves from the external storage unit the recovery file that matches with the call ID output by the transmitting/receiving unit and outputs the recovery file to the session control unit and the main storage unit.

9 Claims, 8 Drawing Sheets

FIG.3

| CALL ID | CALLER | CALLEE | ORIGINATING TIME | TALK INITIATION TIME |
|---------|--------|--------|------------------|----------------------|
| 0001 | SIP:abc@aaa.bbb | SIP:def@aaa.bbb | 14:05:23 | 14:05:26 |
| 0002 | SIP:pqr@cde.fg | SIP:xyz@aaa.bbb | 14:05:48 | 14:05:52 |
| ... | ... | ... | ... | ... |

COMMUNICATION MANAGEMENT APPARATUS AND COMMUNICATION MANAGEMENT METHOD

BACKGROUND OF THE INVENTION

1. Field of the Invention

The present invention relates to a communication management apparatus and a communication management method that manage sessions established between users for communication, and, more particularly to a communication management apparatus and a communication management method that can resume service quickly, while securely recovering a session.

2. Description of the Related Art

Conventionally, in a line-switching communication system in which communication is started after a communication line is established between a caller and a callee, various methods have been studied for recovering an established line of a call even in the event of failure. For example, a process is described in Japanese Patent Application Laid-Open No. H7-123451 in which data required for call recovery is stored in a memory, and is referred to for restoring the call.

The conventional process described above has been studied for session recovery in a communication control protocol such as session initiation protocol (SIP). A simple description of session recovery in SIP is given below with reference to FIG. 8.

In SIP, a SIP server controls sessions established one-to-one between a plurality of callers and a plurality of callees. FIG. 8 is a sequence diagram of session recovery performed when failure occurs after establishment of a session between a caller and a callee. As shown in FIG. 8, when establishing a session, the caller sends a session initiation request to the SIP server (step S1) and the SIP server forwards the session initiation request to the callee (step S2).

Upon receiving the session initiation request, the callee sends a session initiation response to the SIP server (step S3) and the SIP server forwards the session initiation response to the caller (step S4). Upon receiving the session initiation response, the caller sends a reception acknowledgment response (ACK) to the SIP server (step S5) and the SIP server forwards the ACK to the callee (step S6), establishing a session between the caller and the callee. The SIP server has a memory in which are stored data concerning session control such as session state management (hereinafter, "session control data") and data concerning resources used in the established session (hereinafter, "call process resource data").

The caller and the callee communicate using the established session. However, if any trouble is detected because of failure of the SIP server, etc. (step S7), the SIP server performs an initial setting for restoring its function (step S8) as well as creates the call process resource data once again from the session control data stored in the memory (step S9), and recovers the session, which has been in a stable communication state.

After the session recovery, the caller sends a session update request to the SIP server at regular intervals (step S10), and the SIP server forwards the session update request to the callee (step S11).

Upon receiving the session update request, the callee sends a session update response to the SIP server (step S12) and the SIP server forwards the session update response to the caller (step S13). Upon receiving the session update response, the caller sends an ACK to the SIP server (step S14), and the SIP server forwards the ACK to the callee (step S15), confirming that the session between the caller and the callee is continuing.

However, as the SIP server performs the initial setting and creates the call process resource data during session recovery simultaneously, the restoration of the SIP server is delayed. In other words, when failure occurs, the SIP server performs initial setting as well as session recovery of the already established session based on the session control data stored in the memory. However, this sequence of processes takes a relatively long time, and it takes a long time until the SIP server is restored. The SIP server is unable to receive a new session initiation request in the meantime, resulting in a delay in the resumption of service.

SUMMARY OF THE INVENTION

It is an object of the present invention to at least partially solve the problems in the conventional technology.

A communication management apparatus according to one aspect of the present invention manages a session established between users for communication, and includes a receiving unit that receives a signal that controls the session between the users, a main storage unit that stores therein, for each session, data used for managing the session based on the signal received by the receiving unit, a creating unit that creates a recovery file for every session and lets the recovery file held outside the main storage unit, the recovery file including a part of the data stored in the main storage unit, a retrieving unit that retrieves the recovery file corresponding to the signal received by the receiving unit after occurrence of trouble in the communication management apparatus, and a control unit that resumes the management of the session corresponding to the recovery file using the recovery file retrieved by the retrieving unit.

A communication management apparatus according to another aspect of the present invention manages a session established between users for communication having a duplex configuration with a first server and a second server, the first server usually serving as an active system. The first server includes a receiving unit that receives a signal that controls the session between the users, a main storage unit that stores therein, for each session, data used for managing the session based on the signal received by the receiving unit, a creating unit that creates a recovery file for every session and lets the recovery file held outside the main storage unit, the recovery file including a part of the data stored in the main storage unit, and a switching unit that switches the active server from the first server to the second server when trouble occurs in the first server after the recovery-file creating unit lets the recovery file held. The second server includes a receiving unit that receives the signal that controls the session between the users after the second server is deployed as the active server, a retrieving unit that retrieves the recovery file corresponding to the signal received by the receiving unit, and a control unit that resumes the management of the session corresponding to the recovery file using the recovery file retrieved by the retrieving unit.

A communication management method according to still another aspect of the present invention manages a session established between users for communication, and includes firstly receiving a signal that controls the session between the users, storing in a memory, for each session, data used for managing the session based on the signal received in the firstly receiving, creating a recovery file for every session and lets the recovery file held outside the memory, the recovery file including a part of the data stored in the storing, secondly receiving a signal to control the session between the users after occurrence of trouble in the communication management apparatus, retrieving the recovery file corresponding to the signal received in the secondly receiving, and controlling to resume the management of the session corresponding to the recovery file using the recovery file retrieved in the retrieving.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of a recovery file according to one embodiment;

DETAILED DESCRIPTION OF THE PREFERRED EMBODIMENTS

Exemplary embodiments of the present invention are described below with reference to the accompanying drawings. Communication in session initiation protocol (SIP) is described here. However, the present invention can be applied to any protocol in which a session is established by signaling, other than SIP.

Figure 1:
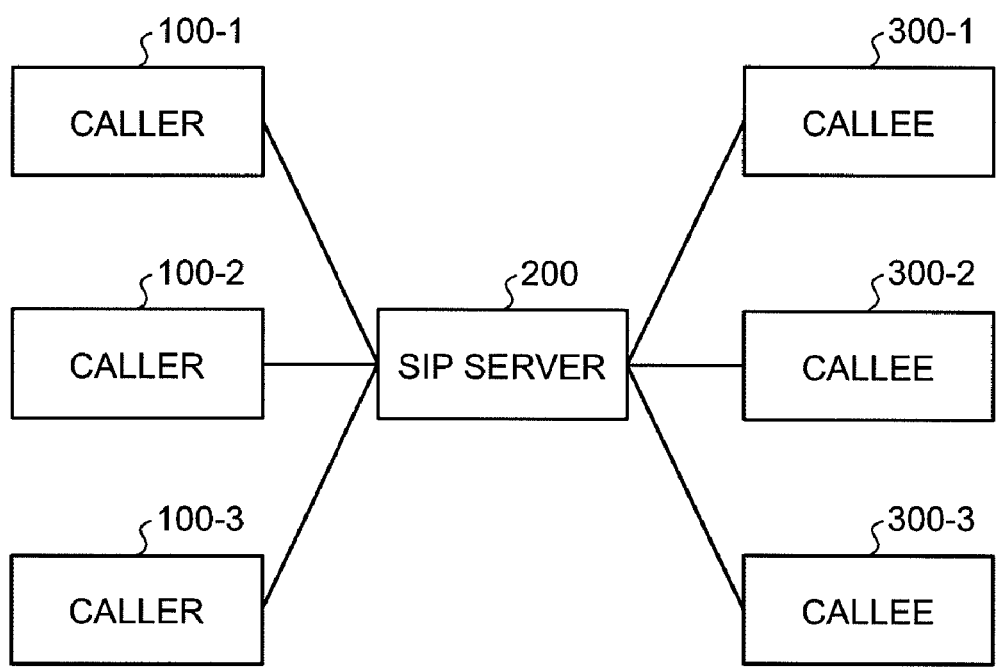
FIG. 1 is a schematic of a communication system according to one embodiment of the present invention.

FIG. 1 is a schematic of a communication system according to one embodiment of the present invention. As shown in FIG. 1, callers 100-1 to 100-3 communicate with the callees 300-1 to 300-3 via regular telephone or video phone, after having established sessions with the callees 300-1 to 300-3 via a SIP server 200 in the embodiment. The SIP server 200 can support any number of callers and callees, though only three callers and callees are shown in the present example.

In such a communication system, if the caller 100-1 wants to communicate with the callee 300-1, the caller 100-1 sends a session initiation request to the SIP server 200, and the SIP server 200 forwards the session initiation request to the callee 300-1. In response to the session initiation request, the callee 300-1 sends a session initiation response to the SIP server 200, and the SIP server 200 forwards the session initiation response to the caller 100-1. In response to the session initiation response, the caller 100-1 sends an ACK, which is a reception acknowledgement response, to the callee 300-1 via the SIP server 200, whereby a session is established.

Once the session is established, the caller 100-1 and the callee 300-1 communicate using the established session. The caller 100-1 sends a session update request at regular intervals to confirm that the session between the caller 100-1 and the callee 300-1 is continuing, and the SIP server 200 forwards the session update request to the callee 300-1. As with the session initiation request, a session update response and an ACK are exchanged between the caller 100-1 and the callee 300-1, confirming that the session is continuing.

When terminating the communication, a session termination request and a session termination response are exchanged between the caller 100-1 and the callee 300-1, whereby the session is terminated. Communication between the other callers 100-2 and 100-3 and the callees 300-2 and 300-3 also takes place likewise. Hereafter, the callers 100-1 to 100-3 who make a call when the session is established shall be collectively denoted as the caller 100. Likewise, the callees 300-1 to 300-3 who receive a call when the session is established shall be collectively denoted as the callee 300.

In the present embodiment, at a time of establishment of a session, the SIP server 200 stores in an external memory, such as a hard disk, a recovery file containing data required for session recovery. The data in the recovery file include data pertaining to the caller 100 and the callee 300, and the originating time, etc. When trouble such as failure is detected in the SIP server 200, the SIP server 200 initializes a memory, which serves as a main memory, for session restoration, and resumes service. Meanwhile, if there is a session update request or a session update response in the form of a SIP signals from the caller 100 or the callee 300 in the already established session, the SIP server 200 receives these SIP signals. The SIP server 200 then creates, using the recovery file stored in the external memory, a new call process resource data only for the session in which the signals are received, and restores the session to the state prior to the failure.

Figure 2:
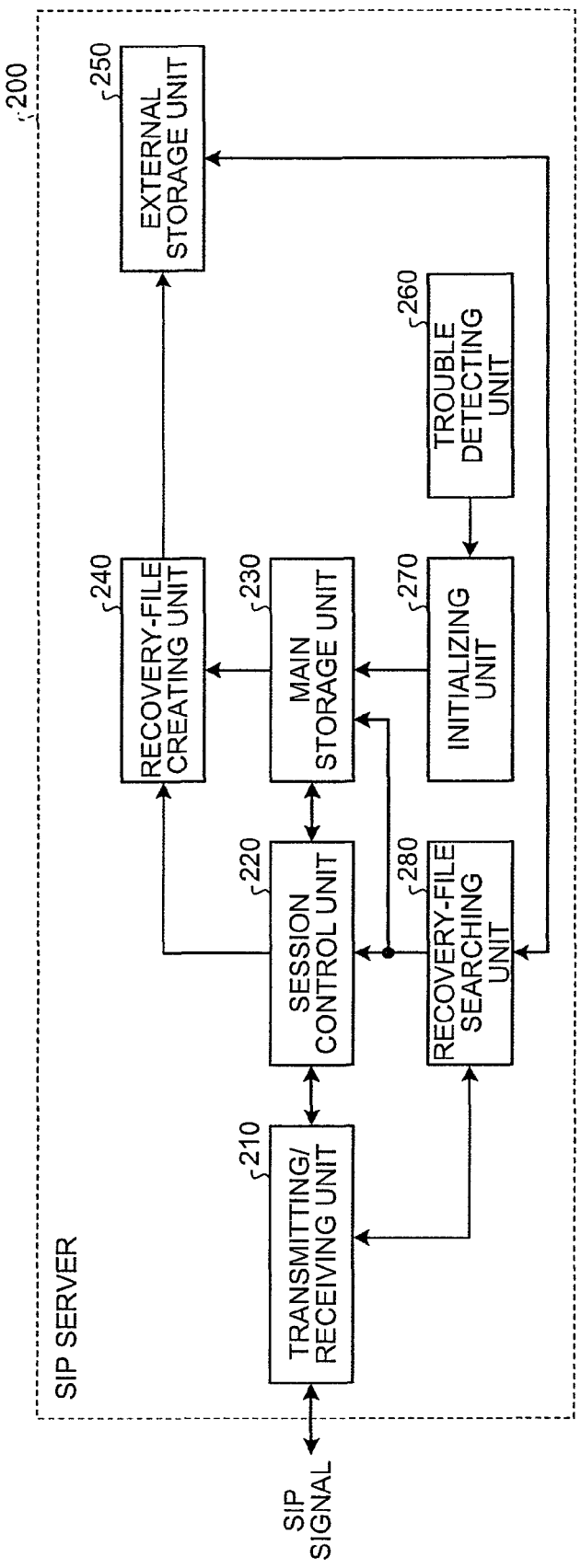
FIG. 2 is a block diagram of a SIP server according to one embodiment.

FIG. 2 is a block diagram of the SIP server 200 according to the embodiment. The SIP server 200 includes a transmitting/receiving unit 210, a session control unit 220, a main storage unit 230, a recovery-file creating unit 240, an external storage unit 250, a trouble detecting unit 260, an initializing unit 270, and a recovery-file searching unit 280.

The transmitting/receiving unit 210 receives the SIP signals from the caller 100 and the callee 300 and forwards the SIP signals to the caller 100 and the callee 300 according to the command issued by the session control unit 220 as necessary. Specifically, the transmitting/receiving unit 210 receives the session initiation request and the session update request from the caller 100, and the session initiation response and the session update response from the callee 300 in the form of SIP signals, and forwards these SIP signals to the callee 300 or the caller 100. Upon receiving the SIP signal after the trouble detection in the SIP server 200, the transmitting/receiving unit 210 extracts from the SIP signal a call ID, which is unique to every session, and if the call ID is extracted for the first time after the trouble detection, outputs the call ID to the recovery-file searching unit 280.

The session control unit 220 controls session establishment or session termination according to the SIP signal received by the transmitting/receiving unit 210 by creating an instance as a working area for every session and managing a session state in the instance created for every session. In other words, the session control unit 220, for example, analyses addressees of the SIP signals in the instance created for the respective sessions. Further, the session control unit 220 stores in the main storage unit 230 the call process resource data for every session procured when a session is established, session data, which indicates a content of each session and includes data related to the caller 100 and the callee 300 of each session, the originating time, etc., and instance data of each session.

When the transmitting/receiving unit 210 receives a session initiation response from the callee 300, the session control unit 220 instructs the recovery-file creating unit 240 to create a recovery file in preparation for session recovery.

When the recovery-file searching unit 280 outputs the recovery file, the session control unit 220 once again procures the call process resource of the session corresponding to the recovery file, once again creates the instance used in managing the session, and again stores the call process resource data and the instance data in the main storage unit 230.

The main storage unit 230 stores therein data used by the session control unit 220 for session management, in particular, the call process resource data, the session data, and the instance data for every session during session establishment. When the recovery-file searching unit 280 outputs the recovery file, the main storage unit 230 stores anew the session data included in the recovery file.

Upon receiving the instruction to create the recovery file from the session control unit 220, the recovery-file creating unit 240 reads the session data that includes the caller 100 and the callee 300, the originating time, talk initiation time, etc., from the main storage unit 230, and creates a recovery file for every session by associating the session data with the call ID of the session. The recovery-file creating unit 240 then stores the recovery file in the external storage unit 250. The recovery file created by the recovery-file creating unit 240 also contains other data such as information necessary for billing the user apart from the session data.

The external storage unit 250 is an external storage device such as a hard disk or a flash memory, and stores therein the recovery file created by the recovery-file creating unit 240. In other words, as shown in FIG. 3, the external storage unit 250 stores therein the recovery files, each file containing data such as the caller 100, the callee 300, the originating time, and the talk initiation time, associated with the call ID of each session. The external storage unit 250 can be an independent entity from the SIP server 200.

The trouble detecting unit 260 detects trouble such as failure in the SIP server 200, and upon detection of trouble, notifies the initializing unit 270 of the trouble.

Upon being notified of the trouble by the trouble detecting unit 260, the initializing unit 270 initializes the main storage unit 230, deleting the data stored in the main storage unit 230. In other words, in the event of any problem in the SIP server 200, the initializing unit 270 deletes the existing call process resource data, the session data, and the instance data stored for each session in the main storage unit 230, so as to allow the reception of a new session initiation request and to resume the service quickly.

The recovery-file searching unit 280 looks in the external storage unit 250 for the recovery file that matches with the call ID output by the transmitting/receiving unit 210, and if the pertinent recovery file is stored in the external storage unit 250, outputs the pertinent recovery file to the session control unit 220 and the main storage unit 230. If there is no recovery file that matches with the call ID output from the transmitting/receiving unit 210 in the external storage unit 250, the recovery-file searching unit 280 causes the transmitting/receiving unit 210 to transmit an error signal assuming that an error occurs.

Figure 4:
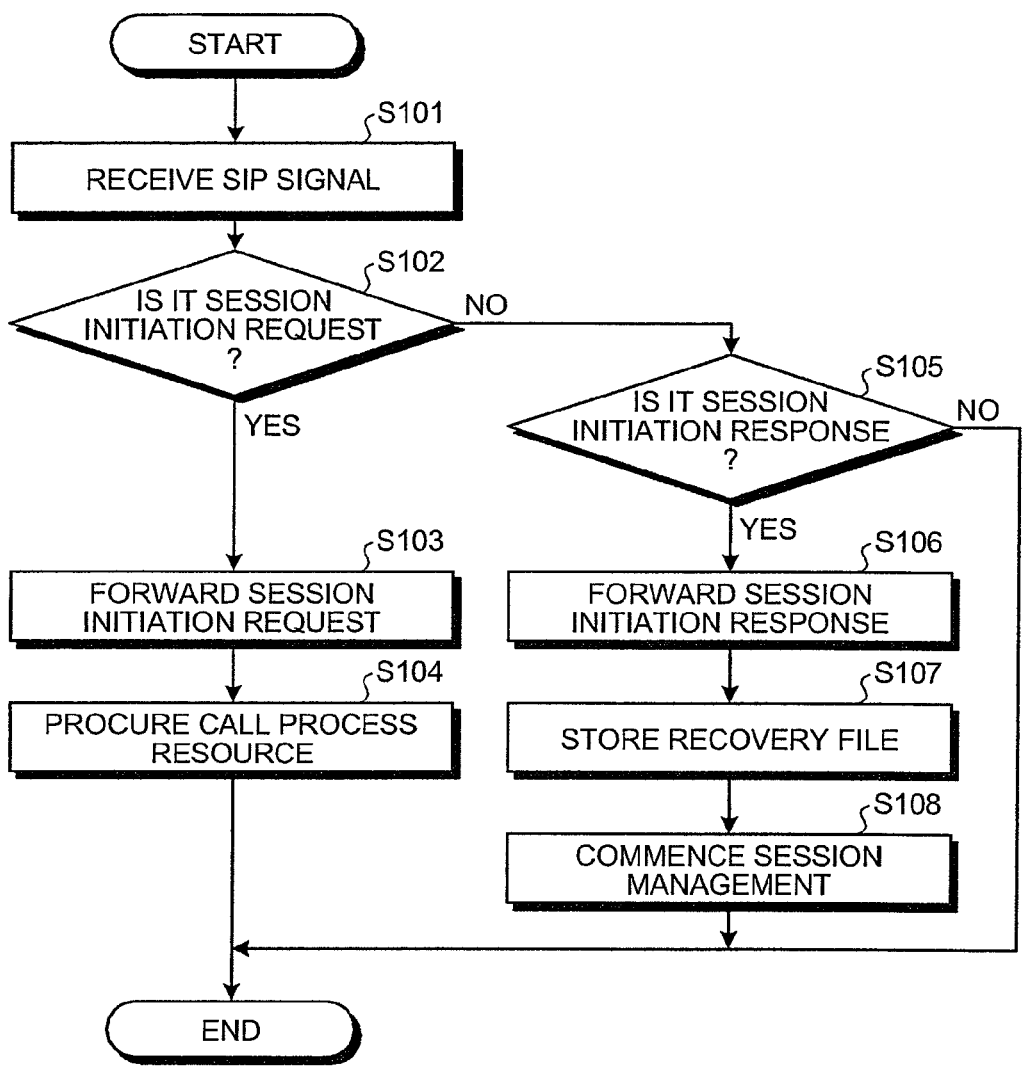
FIG. 4 is a flowchart of a session initiation process according to one embodiment.

A session initiation process performed by the SIP server 200 when initiating a session between the caller 100 and the callee 300 is described below with reference to the flowchart of FIG. 4.

Two types of SIP signals, one for session initiation request and another for session initiation response, are exchanged between the caller 100 and the callee 300 at a time of session initiation. The transmitting/receiving unit 210 of the SIP server 200 receives the SIP signal (step S101) and determines whether the SIP signal is a session initiation request from the caller 100 (step S102).

If the SIP signal is a session initiation request (Yes at step S102), the transmitting/receiving unit 210 notifies the session control unit 220 that a session initiation request has been received, upon which the session control unit 220 instructs the transmitting/receiving unit 210 to forward the session initiation request to the callee 300. Accordingly, the transmitting/receiving unit 210 forwards the session initiation request to the callee 300 (step S103). The session control unit 220 creates the instance to manage the newly initiated session, procures the call process resource for the session (step S104), and stores the instance data and the call process resource data in the main storage unit 230. The session control unit 220 stores the caller 100 and the callee 300 (which are identified from the session initiation request), the originating time etc., which are part of session data, in the main storage unit 230, associating them with the call ID.

When a preparation for establishing a session is thus made, and the session initiation request is transmitted to the callee 300, a session initiation response is transmitted from the callee 300 in response to the session initiation request. The transmitting/receiving unit 210 of the SIP server 200 receives the session initiation response, and as the SIP signal is not a session initiation request (No at step S102), the transmitting/receiving unit 210 determines whether the SIP signal is a session initiation response (step S105). If the SIP signal is not a session initiation response (No at step S105), the SIP server 200 ends the process as the SIP signal is not deemed as concerning session initiation.

However, as the SIP signal is a session initiation response in the example (Yes at step S105), the transmitting/receiving unit 210 notifies the session control unit 220 that the session initiation response has been received, upon which the session control unit 220 instructs the transmitting/receiving unit 210 to forward the session initiation response to the caller 100. Accordingly, the transmitting/receiving unit 210 forwards the session initiation response to the caller 100 (step S106). Once the caller 100 receives the session initiation response, a session is established between the caller 100 and the callee 300, and a talk is initiated. With the initiation of the talk, data such as talk initiation time is added to the session data stored in the main storage unit 230.

When the session initiation response is received from the callee 300, the session control unit 220 instructs the recovery-file creating unit 240 to create a recovery file. Accordingly, the recovery-file creating unit 240 retrieves the session data from the main storage unit 230 and creates the recovery file. In other words, the recovery-file creating unit 240 retrieves the data necessary for billing, such as the caller 100, the callee 300, the originating time, and the talk initiation time, from the main storage unit 230 and creates the recovery file by associating the retrieved data with the call ID, and stores the created recovery file in the external storage unit 250 (step S107). As a result, the external storage unit 250 stores the recovery file for each session in which the call ID is associated with the caller, the callee, the originating time, the talk initiation time, and the like, as shown in FIG. 3.

When a preparation for the session recovery is thus made and the session initiation response is forwarded to the caller 100, the caller 100 transmits an ACK for the session initiation response to the callee 300, establishing a session between the caller 100 and the callee 300. The session control unit 220 commences the management of the established session in the instance corresponding to the session (step S108). Specifically, the session control unit 220 performs analysis of the addresses of the signal exchanged between the caller 100 and the callee 300 in the instance. Further, after establishment of the session, when the transmitting/receiving unit 210 receives the session update request which is sent from the caller 100 at regular intervals, the session control unit 220 controls the forwarding of the session update request and the session update response in the instance to confirm that the session is continuing.

Figure 5:
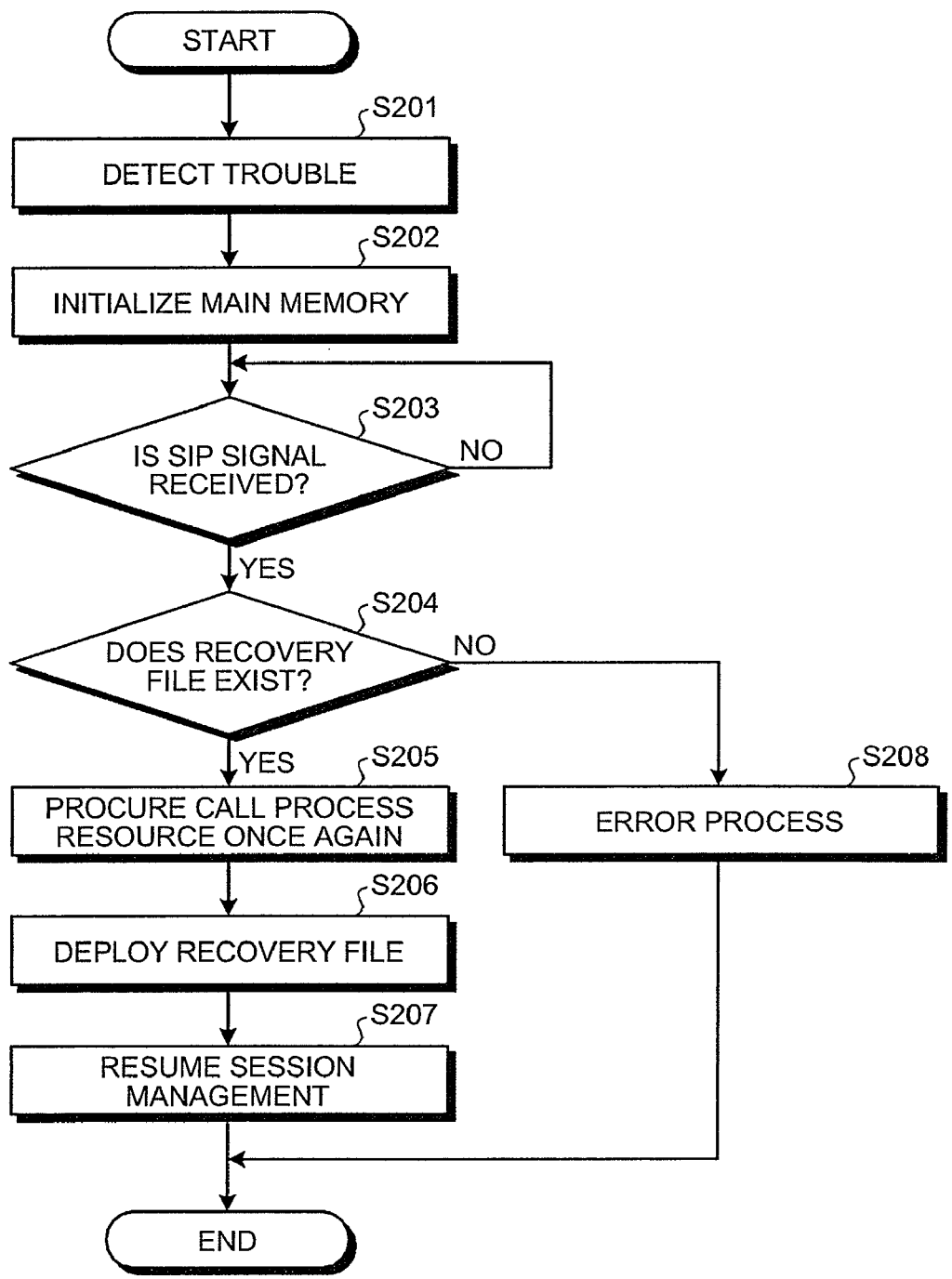
FIG. 5 is a flowchart of a session recovery process according to one embodiment.

A session recovery process for recovering an established session performed when trouble, such as failure, is detected in the SIP server 200 is described below with reference to the flowchart of FIG. 5.

When trouble occurs in the SIP server 200, the trouble detecting unit 260 detects the trouble (step S201) and notifies the initializing unit 270 of the trouble. The initializing unit 270 initializes the main storage unit 230, and deletes the call process resource data, the session data, and the instance data stored in the main storage unit 230 (step S202), letting the SIP server 200 to return to an initial state, and enabling the SIP server 200 to receive a new session initiation request and establish a new session. In other words, the initialization of the main storage unit 230 restores the SIP server 200 to the state prior to session recovery, enabling quick resumption of service.

After restoration, the SIP server 200, which can now receive the SIP signals at the transmitting/receiving unit 210, stands by for receiving the SIP signal (step S203). In the process being described, the SIP server 200 stands by for the SIP signal for an established session, in particular, a session update request, for example. When the session initiation request is received, the SIP server 200 performs the session initiation process. As the transmitting/receiving unit 210 receives the SIP signal of the session update request (Yes at step S203) after the trouble detection by the trouble detecting unit 260, the transmitting/receiving unit 210 extracts the call ID included in the SIP signal. If the call ID is extracted for the first time after the trouble detection, the transmitting/receiving unit 210 outputs the call ID to the recovery-file searching unit 280. If the call ID has already been extracted after the trouble detection, it indicates that the session that corresponds to the pertinent call ID is already recovered, and the session control unit 220 performs session management in the instance as usual.

Upon receiving the call ID, the recovery-file searching unit 280 looks for the recovery file that matches with the call ID in the external storage unit 250 (step S204). If there is no recovery file that matches with the call ID in the external storage unit 250 (No at step S204), the SIP server 200 determines that the session corresponding to the call ID is irrecoverable and performs an error process (step S208). Specifically, the transmitting/receiving unit 210 sends, acting on the instruction from the recovery-file searching unit 280, an error signal indicating that the session cannot be recovered to the caller 100 or the callee 300, as the case may be, that sent the SIP signal after the trouble detection.

As the caller 100 or the callee 300, as the case may be, is notified through the error signal that the session is not recoverable, the caller 100 or the callee 300 can send a session initiation request again to establish a new session. A similar error can also occur, for example, when a failure occurs in the SIP server 200 after the session initiation request is received by callee 300 but before the session initiation response is sent by the callee 300. In such a case, the recovery-file creating unit 240 has not created a recovery file as the session initiation response has not been forwarded, and there is no corresponding recovery file stored in the external storage unit 250. Therefore, even after restoration of the SIP server 200 and the subsequent reception of the session initiation response sent from the callee 300, a new session will have to be established as the recovery file matches with the call ID included in the session initiation response is not stored in the external storage unit 250.

If the recovery file that matches with the call ID included in the SIP signal received after the trouble detection is stored in the external storage unit 250 (Yes at step S204), the recovery-file searching unit 280 reads and outputs the recovery file to the session control unit 220 and the main storage unit 230. The session control unit 220 once again creates an instance for the session corresponding to the recovery file and once again procures the call process resource (step S205). The session control unit 220 once again stores the call process resource data and the instance data in the main storage unit 230, enabling management of the session established prior to the trouble detection in the SIP server 200. While the session data such as the caller 100, the callee 300, and the originating time included in the recovery file is deployed in the main storage unit 230 (step S206), and though the instance and the call process resource are procured again after the trouble detection, the data related to billing and the like remains in a state before the trouble detection.

Thus, the data related to the established session that are stored in the main storage unit 230 are restored to those prior to the trouble detection in the SIP server 200, enabling session recovery, and allowing the session control unit 220 to resume management of the session in the newly created instance (step S207). Since the session management is resumed in response to the reception of SIP signal after the trouble detection in the SIP server 200, only that session is restored in which the caller 100 or the callee 300 shows a clear intent to restore the session by sending the SIP signal after the trouble detection. Therefore, the process load on the SIP server 200 after the restoration can be lessened by avoiding restoring unnecessary sessions.

In the description so far, only the session corresponding to the recovery file that matches with the call ID in the SIP signal received after the trouble detection in the SIP server 200 is recovered. However, it is also possible to categorize the recovery files into groups and store in the external storage unit 250, so that when one session corresponding to one recovery file in the group is recovered, all the sessions corresponding to the other recovery files in the group are simultaneously recovered. In other words, the caller 100, for example, can categorize the recovery files into groups according to region or company and store the groups in the external storage unit 250. When the recovery-file searching unit 280 retrieves the recovery file from the external storage unit 250, it simultaneously retrieves all the recovery files in the group. Thus, all the sessions initiated and established by the same region or company are simultaneously recovered, enabling session recovery to be performed efficiently.

Figure 6:
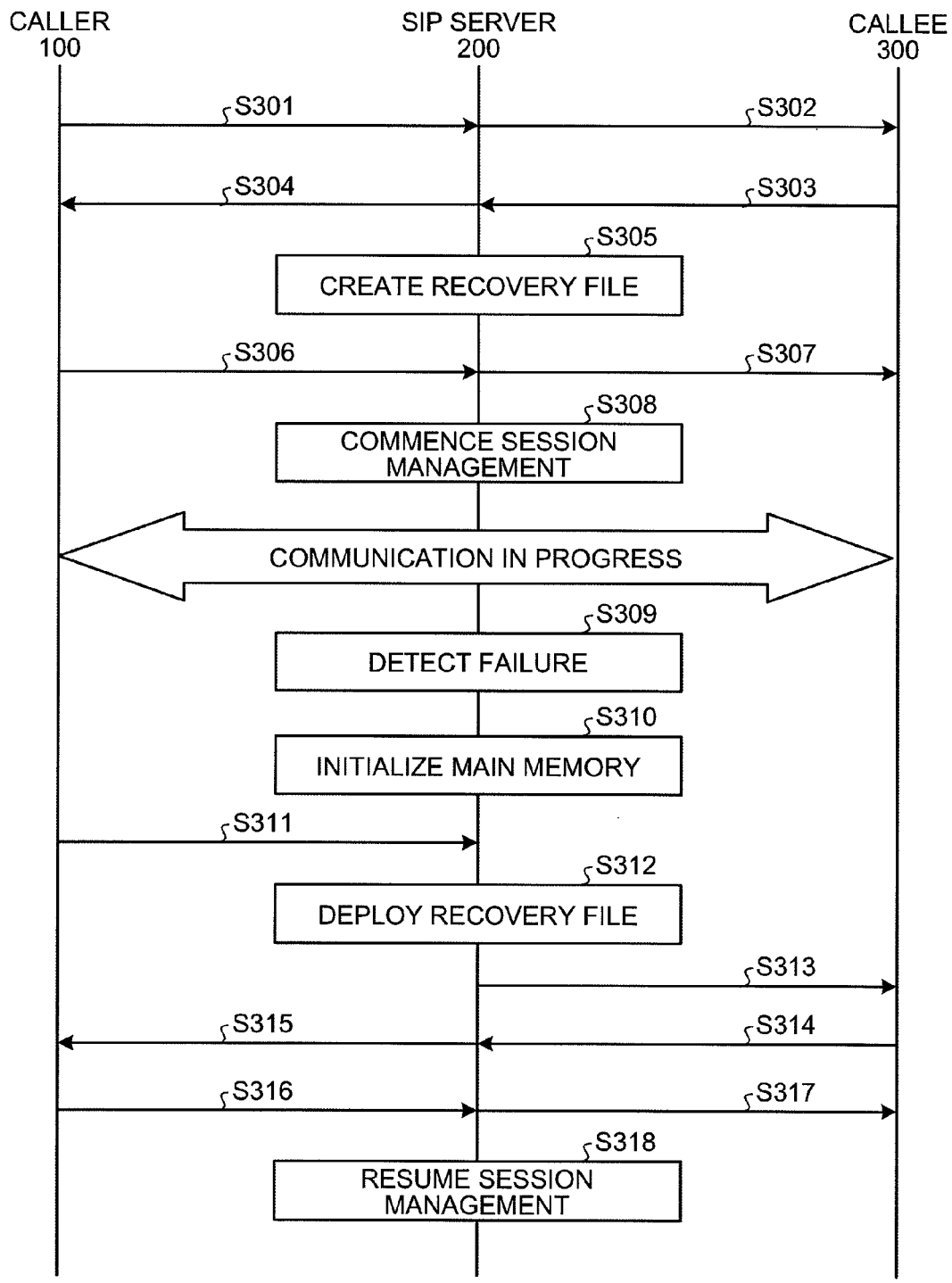
FIG. 6 is a sequence diagram of an example of a communication process according to one embodiment.

An example of a series of processes performed by the SIP server 200 for recovering a session in the event of failure in the SIP server 200 after establishment of the session between the caller 100 and the callee 300 will be described with reference to a sequence diagram of FIG. 6.

To establish a session, the caller 100 sends a session initiation request to the SIP server 200 (step S301), which is received by the transmitting/receiving unit 210 of the SIP server 200. The session control unit 220 then creates an instance to be assigned to the session and procures the call process resource, and the transmitting/receiving unit 210 forwards the session initiation request to the callee 300 (step S302).

In response to the session initiation request, the callee 300 sends a session initiation response to the SIP server 200 (step S303), which is received by the transmitting/receiving unit 210 of the SIP server 200. The session control unit 220 stores the session data, such as talk initiation time, in the main storage unit 230, and the transmitting/receiving unit 210 forwards the session initiation response to the caller 100 (step S304). The session control unit 220 notifies the recovery-file creating unit 240 that a session initiation response has been received. The recovery-file creating unit 240 reads the necessary data from the main storage unit 230 and creates a recovery file (step S305), and stores the recovery file in the external storage unit 250.

Upon receiving the session initiation response from the SIP server 200, the caller 100 sends an ACK to the SIP server 200 (step S306), which forwards the ACK to the callee 300 (step S307). Thus, a session is established between the caller 100 and the callee 300, and the session control unit 220 of the SIP server 200 commences the management of the session in the instance corresponding to the session (step S308), whereby the caller 100 and the callee 300 communicate.

If trouble such as a failure occurs in the SIP server 200 while the communication between the caller 100 and the callee 300 is in progress, the trouble detecting unit 260 detects the trouble (step S309), and notifies the initializing unit 270 of the trouble. The initializing unit 270 initializes the main storage unit 230 (step S310), deleting from the main storage unit 230 the call process resource data, the session data, and the instance data of the established session. Thereby, the main storage unit 230 returns to the initial state, enabling the SIP server 200 to resume service and receive the SIP signal transmitted by the caller 100 and the callee 300.

As the caller 100 and the callee 300 communicate in an established session, the caller 100 sends the session update request to the SIP server 200 at regular intervals to confirm that the session is continuing (step S311), and as the SIP server 200 is capable of receiving the SIP signals as described earlier, the transmitting/receiving unit 210 receives the session update request sent by the caller 100. As the session update request is received by the transmitting/receiving unit 210 after the trouble detection in the SIP server 200, the transmitting/receiving unit 210 extracts the call ID from the session update request and determines whether the call ID has been extracted for the first time after the trouble detection.

As the SIP signal is received from the caller 100 for the first time after the trouble detection, the extracted call ID is also extracted for the first time, and therefore the transmitting/receiving unit 210 outputs the call ID to the recovery-file searching unit 280. The recovery-file searching unit 280 looks for the recovery file that matches with the call ID in the external storage unit 250 and outputs the recovery file to the session control unit 220 and the main storage unit 230, where the recovery file is deployed (step S312). The session control unit 220 once again creates the instance for the session corresponding to the recovery file, once again procures call process resource, and once again stores the data such as the caller 100, the callee 300, and the originating time, included in the recovery file in the main storage unit 230. Thus, the data concerning the session between the caller 100 and the callee 300 stored in the main storage unit 230 returns to the state prior to the trouble detection in the SIP server 200, and the data related to billing and the like is taken over in a state before the trouble detection from the time the session is established. In other words, the session between the caller 100 and the callee 300 is recovered.

The transmitting/receiving unit 210 forwards the session update request to the callee 300 (step S313). In response, the callee 300 sends a session update response to the SIP server 200 (step S314). The SIP server 200 forwards the session update response to the caller 100 (step S315). In response to the session update response forwarded from the SIP server 200, the caller 100 sends an ACK to the SIP server 200 (step S316), which the SIP server forwards to the callee 300 (step S317). Thus, it is confirmed that the session between the caller 100 and the callee 300 is continuing, and the session control unit 220 of the SIP server 200 resumes management of the session in the instance created again by the session control unit 220 of the SIP server 200 (step S318).

Thus, according to the embodiment, the data required for session recovery is stored in the external memory when establishing a session, and in the event of trouble, the SIP server is restored by initializing the main memory. When a SIP signal is received after trouble occurs, the recovery file concerning a session of the transmission source of the SIP signal is retrieved from the external memory, and once again instance and call process resource is procured. However, the data related to billing and the like remains in a state from the time the session is established. Consequently, the main memory can be restored to the state prior to occurrence of failure, and the session can be securely recovered. When trouble occurs, the SIP server can resume service without having to wait for the session to be restored. Consequently, service can be resumed quickly while performing a secure session recovery.

Figure 7:
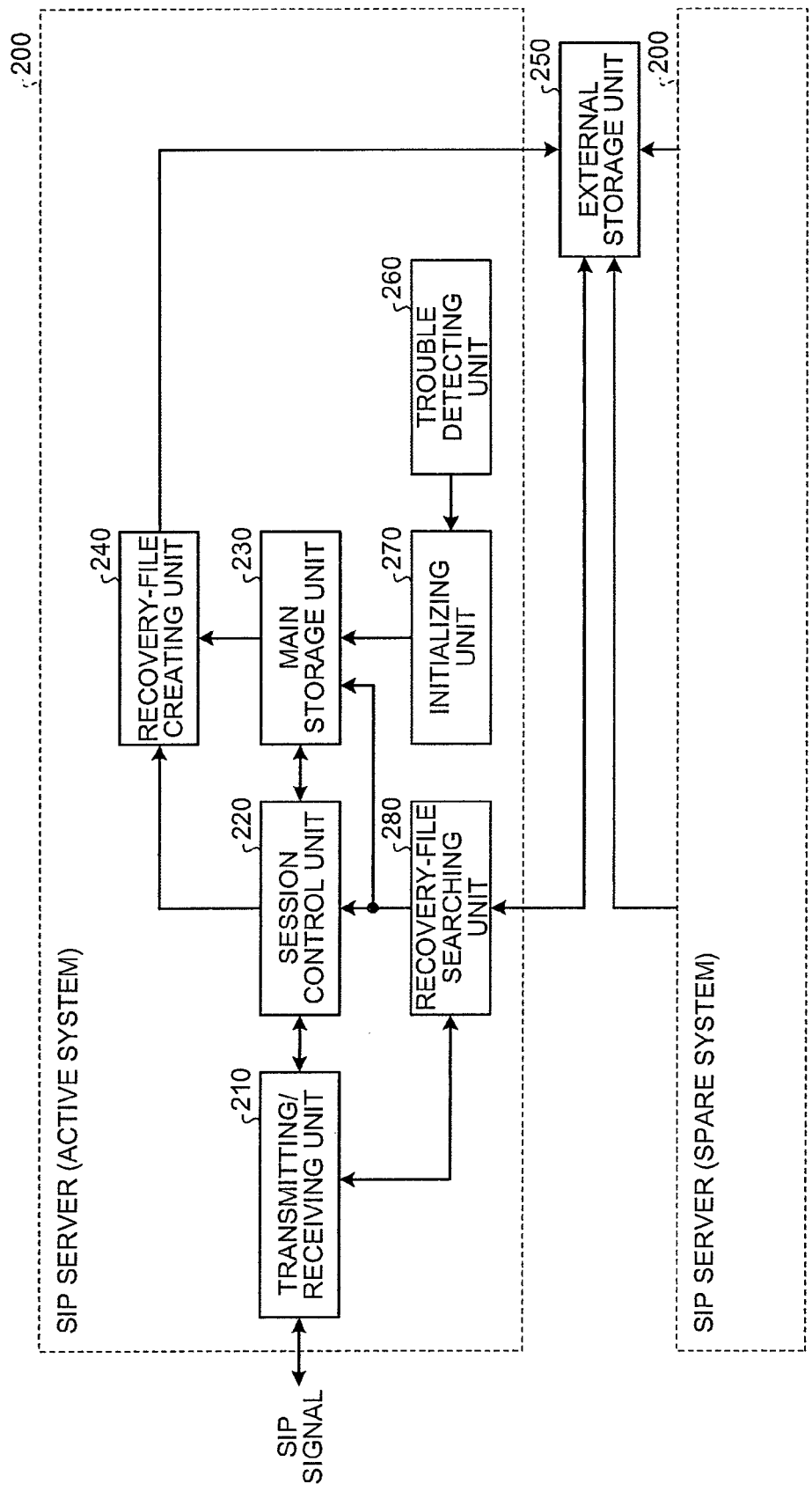
FIG. 7 is a block diagram of a modified form of the SIP server according to one embodiment.
Figure 8:
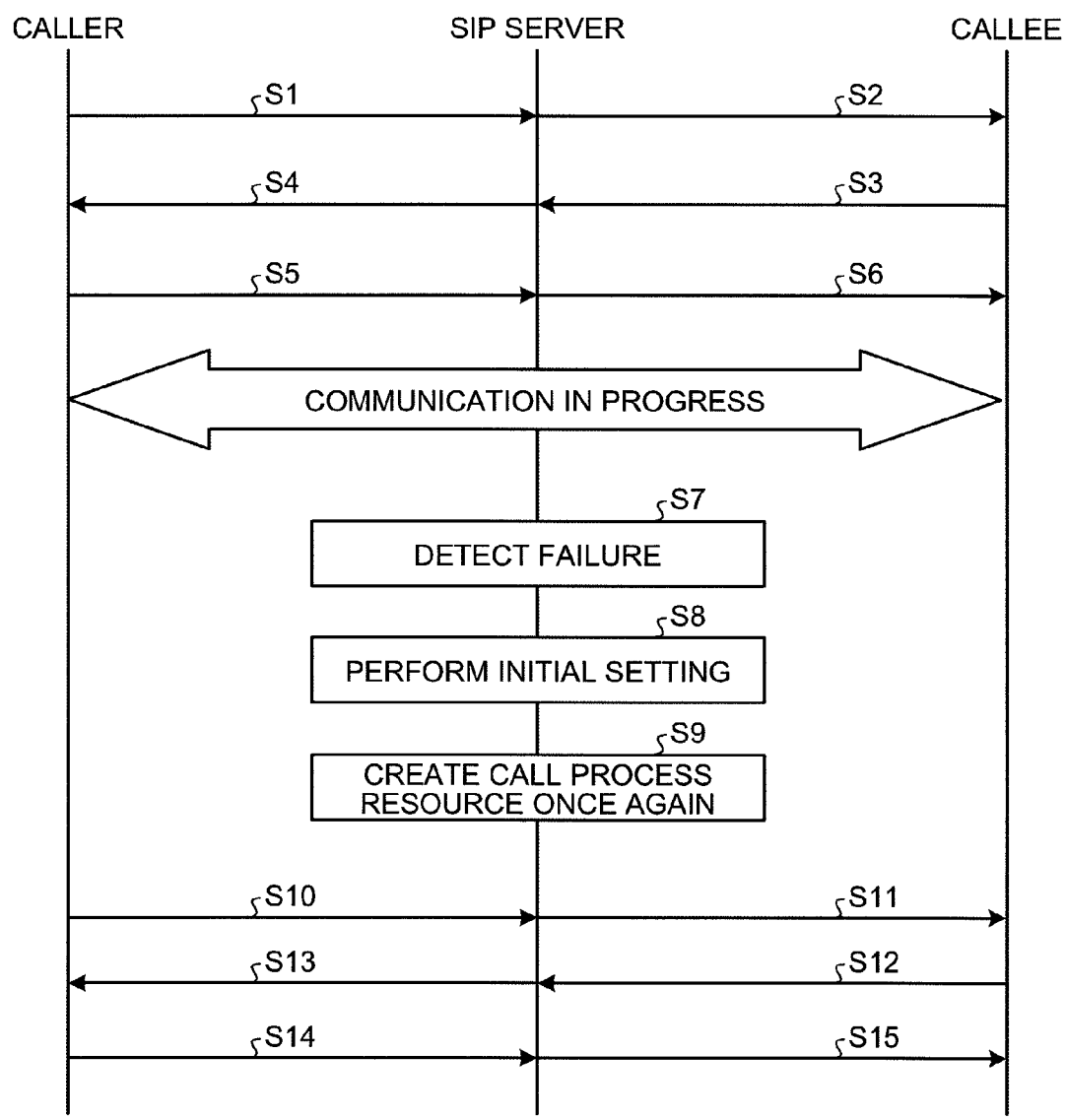
FIG. 8 is a sequence diagram of a conventional session recovery process.

To enhance reliability of communication management, the SIP server 200 can be provided in duplicate, by providing the SIP server 200 in an active system and the SIP server 200 in a spare system. When failure occurs in the SIP server 200 of the active system, the SIP server 200 of the spare system can be deployed to continue control of the session. FIG. 7 is a schematic drawing of a variation of the embodiment described above in which two SIP servers are provided The internal configuration of the SIP server 200 of the spare system is identical to that of the SIP server 200 of the active system and is therefore not shown in FIG. 7.

As shown in FIG. 7, the external storage unit 250 that stores a recovery file therein is shared by both the SIP server 200 of the active system and the spare SIP server 200 of the spare system. Thus, the recovery file created by the recovery-file creating unit 240 in the SIP server 200 of the active system and stored in the external storage unit 250 can be referred to by the SIP server 200 of the spare system as well. In the event of trouble in the SIP server of the active system, the spare system can be changed to the active system, and the SIP server 200 of the new active system performs session restoration by using the recovery file stored in the external storage unit 250.

Thus, by storing the recovery file in the common external storage unit 250, session can be securely recovered even when systems are switched. Further, as the data required for session recovery is stored in the external storage unit 250 as a recovery file, every piece of data stored in the main storage unit 230 of the SIP server 200 of the active system need not be forwarded to the main storage unit 230 of the SIP server 200 of the spare system. The external storage unit 250 can be provided within the SIP server 200 of the active system or of the spare system instead of outside of the SIP server 200 of the active system and of the spare system.

According to the present invention, when trouble occurs in the communication management apparatus, the memory is initialized and the communication management apparatus is quickly restored. After restoration of the communication management apparatus, only the session for which the signal to control the session is received by the communication management apparatus is restored using the recovery file. As a result, service can be resumed quickly while performing a secure session recovery.

According to the present invention, the communication management apparatus can be restored securely and the service can be resumed.

According to the present invention, even if the memory is initialized after commencement of communication between the users, billing can be done accurately for the communication from the time of commencement of communication based on the recovery file.

According to the present invention, even if the call process resource data procured at the time of commencement of communication is deleted from the memory, the session can be continued by procuring the call process resource once again.

According to the present invention, even if the instance data created at the time of commencement of communication is deleted from the memory, the session can be continued by creating the instance once again.

According to the present invention, even if the memory is initialized when trouble occurs in the communication management apparatus, the memory can be returned to the state prior to the trouble.

According to the present invention, the recovery file corresponding to the signal received after the occurrence of trouble in the communication management apparatus can be securely retrieved, and the session can be recovered between the users having an intent to continue the communication.

According to the present invention, reliability of the service can be further enhanced by enabling another communication management apparatus outside of the communication management apparatus in which trouble has occurred to recover the session using the recovery file.

According to the present invention, if error occurs in the first server, the second server can be deployed as the active server and the service can be resumed. After the second server is deployed as the active server, the session for which the second server receives the signal can be restored by the second server using the recovery file. As a result, service can be resumed quickly while performing a secure session recovery.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication management apparatus that manages a session established between users for communication, the communication management apparatus comprising:
    a receiver that receives a signal that controls the session between the users;
    a main memory that stores therein, for each session, data used for managing the session based on the signal received by the receiver;
    a generator that generates a recovery file for every session and stores the recovery file in an external memory other than the main memory, the recovery file including a part of the data stored in the main memory;
    an initializer that initializes the main memory when a failure occurs in the communication management apparatus;
    a retriever that retrieves, when the main memory is initialized by the initializer and a new signal for an established session established before the failure is received by the receiver, the recovery file corresponding to the new signal from the external memory; and
    a controller that resumes the management of the established session corresponding to the recovery file using the recovery file retrieved by the retriever.

2. The communication management apparatus according to claim 1, wherein the generator generates the recovery file including therein user billing data stored in the main memory.

3. The communication management apparatus according to claim 1, wherein the controller once again procures a call process resource assigned to the established session corresponding to the recovery file retrieved by the retriever.

4. The communication management apparatus according to claim 1, wherein the controller once again creates an instance for managing the established session corresponding to the recovery file retrieved by the retriever.

5. The communication management apparatus according to claim 1, wherein the main memory takes over and stores therein the data included in the recovery file as the data pertaining to the established session corresponding to the recovery file retrieved by the retriever.

6. The communication management apparatus according to claim 1, wherein the generator generates the recovery file including therein a session identification data, and
    the retriever extracts the session identification data included in the new signal received by the receiver, and retrieves the recovery file that matches with the session identification data included in the signal.

7. The communication management apparatus according to claim 1, wherein the generator stores the recovery file for each session in the external memory outside the communication management apparatus.

8. A communication management apparatus that manages a session established between users for communication having a duplex configuration with a first server and a second server, the first server usually serving as an active system,
    wherein the first server includes,
        a receiver that receives a signal that controls the session between the users,
        a main memory that stores therein, for each session, data used for managing the session based on the signal received by the receiver,
        a generator that generates a recovery file for every session and stores the recovery file in an external memory outside the first server, the recovery file including a part of the data stored in the main memory, and
        a switch that switches the active server from the first server to the second server when a failure occurs in the first server after the generator stores the recovery file, and
    the second server includes,
        a receiver that receives a new signal that controls an established session between the users after the second server is deployed as the active server, the established session established by the first server before the failure,
        a retriever that retrieves the recovery file corresponding to the new signal received by the receiver from the external memory, and
        a controller that resumes the management of the established session corresponding to the recovery file using the recovery file retrieved by the retriever.

9. A method for a communication management apparatus managing a session established between users for communication, the method comprising:
    firstly receiving a signal that controls the session between the users;
    storing in a main memory, for each session, data used for managing the session based on the signal received in the firstly receiving;

creating a recovery file for every session and storing the recovery file in an external memory other than the main memory, the recovery file including a part of the data stored in the main memory;

initializing the main memory when a failure occurs in the communication management apparatus;

secondly receiving a new signal to control an established session between the users, the established session established before the failure;

retrieving the recovery file corresponding to the new signal received in the secondly receiving from the external memory; and controlling to resume the management of the established session corresponding to the recovery file using the recovery file retrieved in the retrieving.

* * * * *